United States Patent [19]
Oh

[11] Patent Number: 5,311,312
[45] Date of Patent: May 10, 1994

[54] GHOST CANCELLING METHOD AND APPARATUS WHICH PERFORM A CORRELATIVE OPERATION TO SPEED PROCESSING

[75] Inventor: Jin S. Oh, Kwangmyung, Rep. of Korea

[73] Assignee: Samsung Electronics Co., Ltd., Kyungki, Rep. of Korea

[21] Appl. No.: 985,102

[22] Filed: Dec. 3, 1992

[30] Foreign Application Priority Data
Dec. 6, 1991 [KR] Rep. of Korea ................ 91-22255

[51] Int. Cl.$^5$ .............................................. H04N 5/21
[52] U.S. Cl. .................................................. 348/614
[58] Field of Search .............. 358/905, 166, 167, 36, 358/37; H04N 5/21, 5/213

[56] References Cited

U.S. PATENT DOCUMENTS

| | | | |
|---|---|---|---|
| 4,413,282 | 11/1983 | Wargo | 358/167 |
| 4,864,403 | 9/1989 | Chao et al. | 358/167 |
| 4,897,727 | 1/1990 | Tanaka et al. | 358/167 |
| 5,025,317 | 6/1991 | Koguchi et al. | 358/167 |
| 5,045,947 | 9/1991 | Herman et al. | 358/167 |

Primary Examiner—Victor R. Kostak
Assistant Examiner—Nathan J. Flynn
Attorney, Agent, or Firm—Sughrue, Mion, Zinn, Macpeak & Seas

[57] ABSTRACT

There is provided a ghost cancelling method and apparatus in which a video signal is input to a transversal filter to generate a ghost correction signal and the ghost correction signal is mixed with the original video signal to automatically cancel a ghost. To improve the ghost cancelling speed, a correlative operation is performed between the video signal input and a ghost cancelling reference signal, to thereby determine an initial filter coefficient of the transversal filter.

3 Claims, 1 Drawing Sheet

GHOST CANCELLING METHOD AND APPARATUS WHICH PERFORM A CORRELATIVE OPERATION TO SPEED PROCESSING

BACKGROUND OF THE INVENTION

Field of the Invention

The present invention relates to a ghost cancelling method and an apparatus thereof for a television video signal. More particularly, the present invention relates to a ghost cancelling method and an apparatus thereof for automatically cancelling a ghost by inputting an original video signal to a transversal filter to generate a ghost correction signal and mixing the ghost correction signal with the original video signal.

When a television signal is transmitted over a channel, the television signal may pick up a ghost signal as a result of a multiplexed path reflected from a big object such as a building, etc. Such a ghost signal is received at a time that is delayed in relation to the main signal, due to the added length of the ghost signal path. Also, since the ghost signal has a narrower amplitude than does the main signal, it appears as a dark image which is offset from the image formed by the main signal on a television screen, when the television signal is reproduced by a receiver.

To remove such an undesired ghost signal from the received signal, various prior art technologies have been proposed. These prior art technologies utilize a common principle in which the main signal is delayed so as to be synchronized with the ghost signal, and the amplitude of the main signal is attenuated so as to be equal to that of the ghost signal.

As a result, the attenuated and delayed main signal, that is, the ghost correction signal, cancels the ghost signal.

As shown in FIG. 1, showing a block diagram of a conventional ghost cancelling apparatus, the above-mentioned ghost correction signal is generated by a transversal filter 3. The ghost correction signal is subtracted from the input image signal x(n) in a subtracter 2, thereby generating a ghost-cancelled signal y(n). The transversal filter 3 comprises a tap delay line 4, a coefficient circuit 5, a filter coefficient memory 8 and an adder 6. The tap delay line 4 sequentially delays the output signal y(n) from the subtracter 2 every cycle. The coefficient circuit 5, which is composed of a plurality of multipliers, each of which is connected to each tap corresponding to each delayed output, multiplies each output by a filter coefficient that is supplied to the coefficient circuit 5 from a filter coefficient memory 8, and supplies each multiplied result to an adder 6. The output of the adder 6 is the ghost correction signal supplied to the subtracter 2.

The filter coefficient of each tap is corrected in a filter coefficient corrector 11, based on an error signal e(n) between a ghost cancelling reference signal r(n) and the ghost-cancelled output signal y(n). The correction occurs every cycle, to thereby generate the optimum ghost correction signal.

In such a conventional ghost cancelling system, an initial filter coefficient of each tap is set to "0". Then, the filter coefficient is corrected based on the video signal generated due to this initial filter coefficient and the ghost-cancelled reference signal. By repeating the above-described filter coefficient correction process, the optimum filter coefficient can be obtained. Accordingly, since a number of repeated correction processes to reach the optimum filter coefficient are required, it takes a long time to cancel the ghost signal. For example, it can take three seconds or so to cancel it. Thus, since the conventional system is delayed in its response to the generated ghost, the ghost is often not sufficiently cancelled. In particular, in cases of time-variant moving ghosts generated due to reflected signals from an airplane, it is not possible to cancel the ghosts adaptively and continuously.

SUMMARY OF THE INVENTION

Therefore, to solve the problems of the above-described conventional ghost cancelling method, it is an object of the invention to provide a method for cancelling a ghost that is capable of swiftly detecting and cancelling a ghost.

It is another object of the invention to provide an apparatus for cancelling a ghost in order to realize the above ghost-cancelling method.

To accomplish the above objects of the present invention, there is provided a ghost cancelling method in which an input video signal is supplied to a transversal filter to generate a ghost correction signal and the ghost correction signal is mixed with the input video signal to cancel a ghost signal, the ghost cancelling method comprising the steps of: performing a correlative operation between the input video signal and a ghost cancelling reference signal; and determining an initial filter coefficient of the transversal filter using the correlative operation result.

Also, there is provided a ghost cancelling apparatus comprising: a transversal filter for generating a ghost-correction signal, a ghost correction portion for mixing the ghost-correction signal with a video signal input to cancel a ghost, and a filter coefficient correction portion for correcting a filter coefficient of the transversal filter based on an error signal between an output from the ghost correction portion and a ghost cancelling reference signal; a correlative operation unit which performs a correlative operation between the initial video signal input and the ghost cancelling reference signal; and an initial filter coefficient calculation unit which calculates an initial filter coefficient of the transversal filter using the correlative operation result.

Other features and advantages of the invention will be apparent from the following description taken in connection with the accompanying drawings.

DETAILED DESCRIPTION OF THE PREFERRED EMBODIMENT

The constitution and operation of a preferred embodiment of the present invention will be described below with reference to FIG. 2 of the accompanying drawings.

Figure 1:
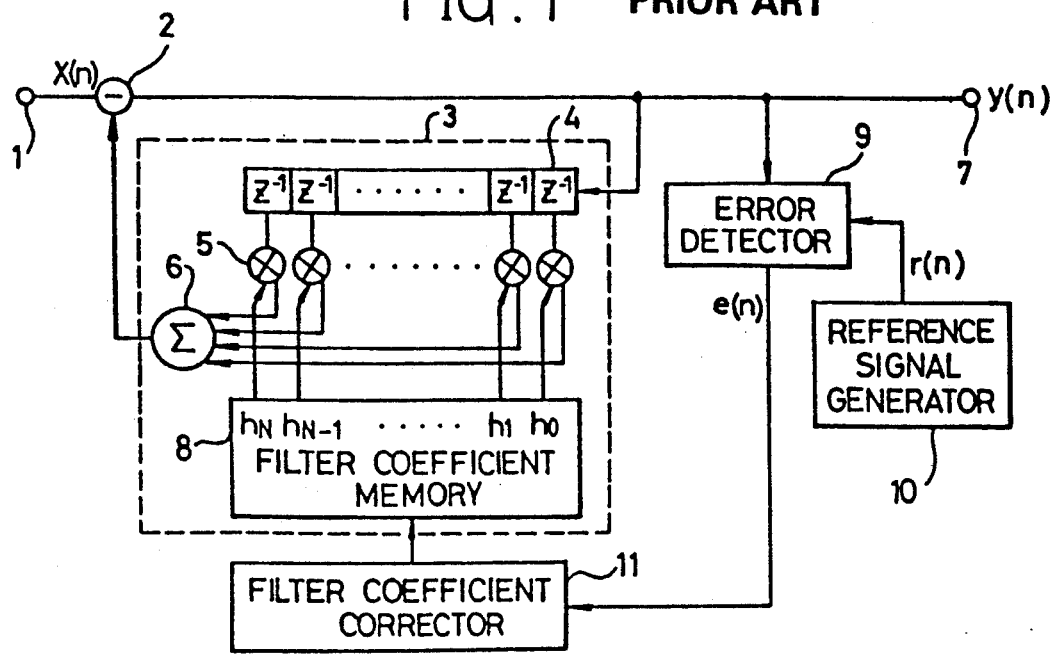
FIG. 1 is a block diagram of a conventional ghost-cancelling apparatus.
Figure 2:
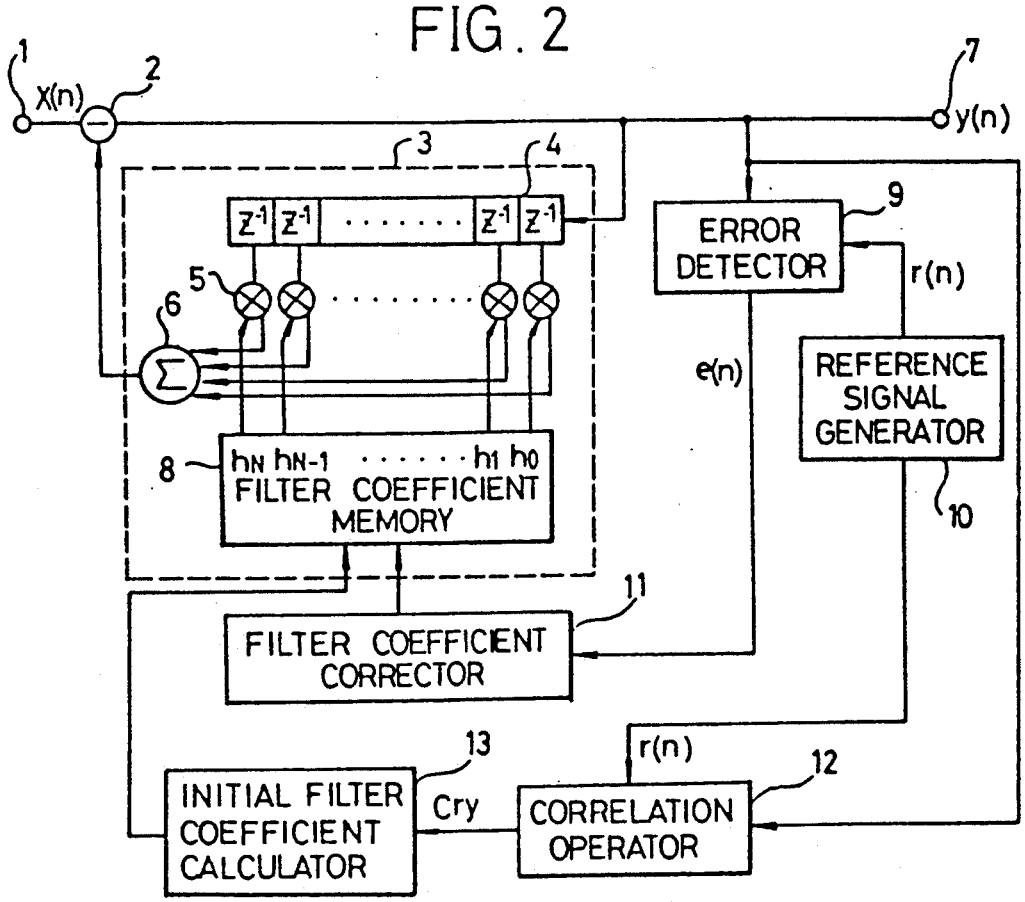
FIG. 2 is a block diagram of a ghost-cancelling apparatus according to the present invention.

The ghost-cancelling apparatus shown in FIG. 2 includes the basic constitution of the conventional ghost-cancelling apparatus shown in FIG. 1. In addition to the conventional features, the ghost-cancelling apparatus according to the present invention further includes a correlation operation portion 12 for performing a correlative operation of the video signal output y(n) and the ghost-cancelled reference signal r(n), and includes an initial filter coefficient calculation portion 13 for determining an initial filter coefficient for the transversal filter 3 using the correlative operation result.

To explain an operation process in the correlative operation portion 12 and the initial filter coefficient calculation portion 13, a process of updating a filter coefficient by a general least mean square (LMS) algorithm in the filter coefficient correction portion 11 will be first described below.

It is assumed that an input signal including a ghost at an input terminal 1 is x(n), an output signal from which the ghost is removed at output terminal 7 is y(n), a reference signal supplied from a reference signal generator 10 is r(n), and a difference between the reference signal r(n) and the output signal y(n) is an error signal e(n). Then, the following equations are established.

$$e(n) = r(n) - y(n) \qquad (1)$$

$$y(n) = x(n) - h^T(n)y(n) \qquad (2)$$

where $h^T(n) = [h_0(n), h_1(n), \ldots, h_N(n)]$ $$y(n) = \begin{bmatrix} y(n) \\ y(n-1) \\ \vdots \\ y(n-N) \end{bmatrix}$$

Here, $h_i(n)$ is a filter coefficient of the i-th tap of transversal filter 3. The filter coefficient is repeatedly updated by the filter coefficient correction portion 11 based on the error signal e(n). That, is, the following equation is met.

$$h(n+1) = h(n) + \Delta h \qquad (3)$$

Here, to optimize the filter coefficient correction amount $\Delta h$, the error function should satisfy the following relationship.

$$\epsilon(h + \Delta h) < \epsilon(h)$$

$$\epsilon(h + \Delta h) \approx \epsilon(h) + \Delta h \times \delta\epsilon(h)/\delta h < \epsilon(h)$$

Here, if $\Delta h = -M[\delta\epsilon(h)/\delta h]$, the following equation is met.

$$\epsilon(h) - M[\delta\epsilon(h)/\delta(h)]^2 < \epsilon(h) \qquad (4)$$

where M is an adaptive constant which is always more than zero.

Also, since $\epsilon = E[e^2(n)]$, $$\begin{aligned} \delta\epsilon(h)/\delta h &= 2E\,[e(n) \times \delta e(n)/\delta h] \\ &= 2E\,[e(n)y(n)] \\ &\approx 2\,e(n)y(n) \end{aligned} \qquad (5)$$

Thus, equation (3) can be expressed by the following equations (6) and (7).

$$h(n+1) = h(n) + \Delta h \qquad (3)$$

$$h(n+1) = h(n) - M[\delta\epsilon(h)/\delta(h) \qquad (6)$$

$$h(n+1) = hZ(n) - 2M \times e(n)y(n) \qquad (7)$$

The above equation (7) is a general LMS equation for correcting a filter coefficient of the tap. The tap coefficient h(n+1) for the (n+1)th cycle is updated by the above correction amount $-2M \times e(n)y(n)$ from the nth tap coefficient h(n). By repeating the above procedure, the coefficient approaches a value capable of removing the ghost to the optimum point.

Thus far, the filter coefficient updating process by the general LMS algorithm has been described. Hereinafter, based on the LMS equation, a process for determining an initial filter coefficient according to the present invention will be described.

If the error function $\epsilon = E[e^2(n)]$ is made to be close to the optimum point, the following equations (8) and (9) ar met.

$$\begin{aligned} E\,[e^2(n)] &= E\,\{[r(n) - y(n)]^2\} \\ &= E\,\{[r(n) - x(n) + h^T(n)y(n)]^2\} \end{aligned} \qquad (8)$$

$$\begin{aligned} \delta\epsilon(h)/\delta h &= E\,[\delta e^2(n)/\delta h] \\ &= 2hE\,[y(n)y^T(n)] + 2E\,[r(n)y(n)] - \\ &\quad 2E\,[x(n)y(n)] \end{aligned} \qquad (9)$$

Here, R equals $E[y(n)y^T(n)]$ which is a self-correlative function of the output signal y(n), Cry equals $E[r(n)y(n)]$, which is a correlative function between the reference signal r(n) and the output signal y(n), and Cxy equals $E[x(n)y(n)]$, which is a correlative function between the input signal x(n) and the output signal y(n).

Thus, equation (7) can be expressed by the following equation (10).

$$\begin{aligned} h(n+1) &= h(n) - M[\delta\epsilon(h)/\delta h] \\ &= h(n) - 2M(hR + Cry - Cxy) \\ &= (1 - 2MR)h(n) + 2M(Cxy - Cry) \end{aligned} \qquad (10)$$

If the adaptive constant M is initially set to $\frac{1}{2}R$, the initial filter coefficient h(0) is expressed by the following equation (11).

$$h(0) = (Cxy - Cry)/R \qquad (11)$$

Here, since the input signal x(n) is initially equal to the output signal y(n), Cxy = R.

Thus, the above equation (11) is simplified as follows.

$$h(0) = 1 - Cry/R \qquad (12)$$

$$= \begin{vmatrix} 1 \\ 0 \\ 0 \\ \vdots \end{vmatrix} - Cry/R$$

From the above equation (12), the initial filter coefficient can be obtained by solving the correlation function between the reference signal r(n) and the input signal x(n) (=y(n)). This process is performed in the correlation operation portion 12 and in the initial filter coefficient calculation portion 13. That is, if the correlation function between the ghost-cancelling reference signal r(n) and the ghost-containing input signal x(n) (=y(n)) is divided by the self-correlation function R of the input signal, the nearly optimized initial filter coefficient can be obtained by a single step.

On the other hand, when a pseudo-random noise (PN) sequence having a very large self-correlation factor is used in connection with the ghost-cancelling reference signal, and it is further assumed that the ghost level is low, the following approximation is possible.

$$R = \begin{vmatrix} R(0) & 0 & 0 & \ldots & \ldots & 0 \\ 0 & \cdot & & & & 0 \\ 0 & & \cdot & & & 0 \\ 0 & & & \cdot & & 0 \\ \cdot & & & & \cdot & \\ \cdot & & & & & \cdot \\ 0 & \ldots & \ldots & \ldots & \ldots & R(0) \end{vmatrix} \quad (13)$$

i.e. $R^{-1} = 1/R(0)$

When using the above equation (13), the initial filter coefficient can be calculated more simply, as compared to when the previous equation (12) is used.

That is, h(0) can be approximately expressed by the following equation (14).

$$h(0) \approx \begin{vmatrix} 1 - C_{ry}(0)/R(0) \\ - C_{ry}(1)/R(0) \\ \cdot \\ \cdot \\ \cdot \\ - C_{ry}(N)/R(0) \end{vmatrix} \quad (14)$$

In addition, since R(0) is approximately equal to Cry(0), the above equation (14) can be expressed as follows:

$$h(0) \approx \begin{vmatrix} 1 - C_{ry}(0)/C_{ry}(0) \\ - C_{ry}(1)/C_{ry}(0) \\ \cdot \\ \cdot \\ \cdot \\ - C_{ry}(N)/C_{ry}(0) \end{vmatrix} = \begin{vmatrix} 0 \\ -C_{ry}(1)/C_{ry}(0) \\ \cdot \\ \cdot \\ \cdot \\ -C_{ry}(N)/C_{ry}(0) \end{vmatrix}$$

Here, only when there is a ghost signal in the input signal, does the peak value of Cry appear. Accordingly, the initial filter coefficient can be simplified as follows.

$$h(0) = \begin{vmatrix} h_0 \\ h_1 \\ h_2 \\ h_3 \\ \cdot \\ \cdot \\ \cdot \\ h_N \end{vmatrix} \approx \begin{vmatrix} 0 \\ 0 \\ -C_{ry}(t_1)/C_{ry}(0) \\ -C_{ry}(t_2)/C_{ry}(0) \\ 0 \\ 0 \\ \cdot \\ \cdot \end{vmatrix} \quad (15)$$

Here, $C_{ry}(t_1)$ and $C_{ry}(t_2)$ represent the peak values of the places where the ghosts occur.

Using the present invention, after the initial filter coefficient is determined as described above, the filter coefficient is corrected by the general LMS algorithm.

As described above, in the ghost cancelling method and apparatus according to the invention, the correlation function between the input signal and the reference signal is obtained. Then, the initial filter coefficient is determined using that correlation function. Thus, the initial filter coefficient, which can approximate the optimum filter coefficient in a single step of calculation, can be supplied to the filter coefficient memory.

Accordingly, the ghost signal can be cancelled at much faster speed, as compared to the conventional ghost cancelling system.

What is claimed is:

1. A ghost cancelling method comprising the steps of:

performing a correlative operation between an output video signal y(n) and a ghost cancelling reference signal r(n) to provide a correlative operation result $C_{ry}$;

determining an initial filter coefficient h(0) of a transversal filter using the correlative operation result $C_{ry}$;

supplying the output video signal y(n) to the transversal filter to generate a ghost correction signal; and mixing the ghost correction signal with an input video signal x(n);

wherein said performing step and said determining step are performed in accordance with the following equations:

$$C_{ry} = E[r(n)y(n)] = \sum_{k=0}^{K} \sum_{n=0}^{N} r(k)y(n+k)$$

and $$h(0) = 1 - \frac{C_{ry}}{R} = 1 - \frac{C_{ry}}{C_{ry}(0)},$$

where $C_{ry}$ is a correlative function between the reference signal r(n) and the output signal y(n), K is a length of the reference signal r(n), N is a number of video samples, and R is a correlative function of the output signal y(n); and wherein the input video signal x(n) is initially equal to the output signal y(n).

2. The ghost cancelling method according to claim 1, wherein, after the initial filter coefficient of the transversal filter is determined, a next filter coefficient is corrected based on an error signal between a ghost canceled video signal output and the ghost cancelling reference signal.

3. A ghost cancelling apparatus comprising:

a transversal filter for generating a ghost-correction signal;

a ghost correction portion that receives the ghost-correction signal nd an external video signal input x(n) and mixes the ghost-correction signal with the video signal x(n) to provide an initial output;

a filter coefficient correction portion that receives an error signal e(n) indicative of an error between the initial output from the ghost correction portion and a ghost-cancelling reference signal r(n) and that supplies an input to said transversal filter for correcting a filter coefficient generated by said transversal filter;

a correlative operation unit which performs a correlative operation between the initial output and the ghost cancelling reference signal to provide a correlative operation result $C_{ry}$; and an initial filter efficient calculation unit which receives the correlative operation result $C_{ry}$, calculates an initial filter coefficient h(0) on th basis of the correlative operation result $C_{ry}$, and outputs the initial filter coefficient h(0) as a further input to said transversal filter;

wherein the correlative operation result $C_{ry}$ and the initial filter coefficient h(0) are given by:

$$C_{ry} = E[r(n)y(n)] = \sum_{k=0}^{K} \sum_{n=0}^{N} r(k)y(n+k)$$

and $$h(0) = 1 - \frac{C_{ry}}{R} = 1 - \frac{C_{ry}}{C_{ry}(0)}$$

where K is a length of the reference signal r(n), N is a number of video samples, and R is a correlative function of the output signal y(n); and wherein the input video signal x(n) is initially equal to the output signal y(n).

* * * * *